United States Patent Office 3,179,627
Patented Apr. 20, 1965

3,179,627
PREPARATION OF POLYURETHANES UTILIZING A COCATALYST SYSTEM OF A TERTIARY AMINE AND A LEAD SALT OF A THIO ACID OF PHOSPHORUS
Harry James Twitchett, Manchester, England, assignor to Imperial Chemical Industries Limited, Millbank, London, England, a corporation of Great Britain
No Drawing. Filed Sept. 12, 1962, Ser. No. 223,248
Claims priority, application Great Britain, Sept. 27, 1961, 34,686/61
19 Claims. (Cl. 260—77.5)

This invention relates to improvements in or relating to the manufacture of polyurethane products by the interaction of hydroxy group containing materials with organic isocyanates.

It is known to carry out the preparation of urethane-group containing materials by reacting hydroxylic compounds with isocyanates in the presence of catalsyts. In particular it has been proposed to manufacture polyurethane products by the reaction of hydroxyl-group containing polymers with organic polyisocyanates using a variety of compounds as catalysts. Catalysts have proved valuable not only in accelerating the reactions, but in allowing lower operating temperatures and in affecting the relative rates of reaction of the isocyanate with for example hydroxyl group containing materials and water. Catalysts that have hitherto been proposed suffer from certain disadvantages. Thus basic catalysts, for example the carbonates and other weak acid salts of the alkali metals and the alkaline earth metals, may promote hydrolytic breakdown of the products. Certain non-basic compounds of metals, for example of the transition metals, have also been proposed as catalysts, but these often have relatively poor catalytic activity, particularly in the presence of water, polyisocyanate and/or hydroxylic compounds such as are used in polyurethane formation; other metallic catalysts are of insufficient solubility to be of value. Certain metallic compounds that have been proposed as catalysts, such as organo-tin compounds promote oxidative degradation of polyurethanes based on, for example, polyethers. Other metal salts such as stannous carboxylates, which have been proposed as catalysts, possess poor storage stability as they are sensitive to both oxidation and reduction.

It has already been proposed to use lead salts of carboxylic acids as catalysts for the reactions of organic isocyanates and now it has been found that lead salts of certain sulphur containing phosphoric, phosphonic and phosphinic acids although only weakly catalytic when used alone are valuable catalysts for the reaction of hydroxylic compounds with isocyanates when such salts are used in conjunction with tertiary amines. The use of such lead salts in conjunction with tertiary amines obviates or minimises the disadvantages associated with the use of the prior art catalysts, such lead salts also have the added advantage that they are of low toxicity compared to previous lead salts such as lead carboxylates, for example lead acetate, which have previously been proposed as catalysts for the rection of hydroxylic compounds with isocyanates. Thus rats recover from a dose of 500 mg./kg. body weight of lead dinonyldithiophosphate administered either orally or by injection.

Thus according to the present invention there is provided a process for the manufacture of urethane group-containing materials by the reaction of organic isocyanates with hydroxyl group-containing compounds characterised in that the said reaction is carried out in the presence of a tertiary amine and a lead salt of a thio acid of phosphorus of the formula

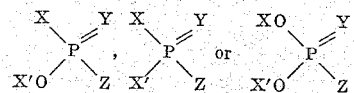

wherein X and X' stand for the same or different organic radicals and Y stands for sulphur and Z stands for the hydroxyl or thiol group.

As examples of organic radicals represented by X and X' there may be mentioned hydrocarbon or substituted hydrocarbon radicals such as alkyl (straight chain or branched), cycloalkyl, aryl, aralkyl radicals and alkyl radicals interrupted by one or more hetero atoms such as O or S.

Alternatively the hydrocarbon radicals or substituted hydrocarbon radicals may together form an alkylene group, optionally substituted with hetero atoms such as O or S, which together with the remainder of the thio acid molecule forms a ring structure containing from 4 to 10 carbon atoms. Furthermore the radicals X and X' may each be bifunctional alkylene radicals, arylene radicals, or alkylene radicals interrupted by hetero atoms such as O or S which each link together two molecules of the thio acid giving rise to a polymeric thio- or dithio-phosphoric, phosphinic or phosphonic acid.

As examples of the hydrocarbon or substituted hydrocarbon radicals X and X' there may be mentioned ethyl, n-butyl, isopropyl, cyclohexyl, cyclohexenyl, phenyl, naphthyl, tolyl, 2-ethyl-hexyl, methoxyethyl, nonyl.

As examples of alkylene or substituted alkylene radicals which together with the remainder of the thio acid molecule form a ring structure containing from 4 to 10 carbon atoms there may be mentioned tetramethylene, pentamethylene, hexamethylene, and the radicals

—CH$_2$CH$_2$—O—CH$_2$CH$_2$— and

—CH$_2$CH(CH$_3$)OCH$_2$CH(CH$_3$)—

As examples of bifunctional radicals which link two thio acid molecules together there may be mentioned decamethylene, p-phenylene and polyoxyalkylene radicals such as

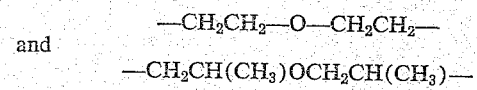

where $n$ represents an integer greater than 1.

As examples of lead salts of sulphur containing phosphoric, phosphinic and phosphonic acids as hereinbefore defined suitable for use in the process of the present invention there may be mentioned thiophosphates such as lead di-cyclohexylthiophosphate, lead di-isooctylthiophosphate, lead di-benzylthiophosphate, di-thiophosphates such as lead di-n-hexyldithiophosphate, lead dicyclohexyldithiophosphate, lead dinonyldithiophosphate, lead octadecyldithiophosphate, lead diphenyldithiophosphate, thiophosphinates such as lead diphenylthiophosphinate, dithiophosphinates such as lead diphenyldithiophosphinate, thiophosphonates such as lead cyclohexenylisooctylthiophosphonate, and dithiophosphonates such as lead cyclohexenylisooctyldithiophosphonate, lead cyclohexenylphenyldithiophosphonate.

Examples of lead salts of sulphur containing phosphoric, phosphinic, and phosphonic acids as hereinbefore defined which are particularly useful in the process of the present invention include lead di-2-ethylhexylthiophosphate, lead di-cyclohexyldithiophosphate, lead dinonyldithiophosphate, lead diphenyldithiophosphate, lead diphenylthiophosphinate and lead cyclohexenylisooctyldithiophosphonate.

Mixtures of lead salts as hereinbefore defined may also be used in the process of the present invention.

The tertiary amines which may be used in the process of the present invention include tertiary amines such as are described in the prior art as catalysts for the reaction of isocyanates with hydroxyl compounds, in particular for polyurethane formation. Such tertiary amine catalysts may be for example basic compounds containing at least one nitrogen atom attached directly to two or three organic radicals, for example hydrocarbon radicals which may contain one or more hetero atoms. The radicals may be, for example aliphatic radicals such as methyl or ethyl, aromatic radicals such as phenyl or heterocyclic radicals such as pyridine. The nitrogen atom may also be a member of more than one ring, for example as in 1:4-diaza-bicyclo-(2:2:2)octane(triethylenediamine), pyrrolizidine or quinuclidine.

Examples of suitable tertiary amine catalysts include trimethylamine, dimethylethylamine, dimethylcyclohexylamine, dimethyl-benzylamine, N-methyl morpholine, N-methylpiperidine, 1:4-diazabicyclo(2:2:2)octane(triethylenediamine), N:N':N''-pentamethyldiethylene triamine, N-methylpyrrolidine, N:N-dimethylpiperazine, N:N'-tetramethylpropylene diamine, 1:4-diazabicyclo - (3:2:2)-nonane, 1:5-diazabicyclo(3:3:2)-decane, pyrrolizidine, 8-methylpyrrolizidine, quinuclidine, N:N'-tetramethylethylene diamine, N:N'-tetramethylhexamethylene diamine, pentamethyl guanidine, tetramethyl-1:3-butandiamine, 2-dimethylaminoethylphenyl ether, 2-dimethylaminoethyl benzyl ether, N:N'-dimethylpiperazine, beta-dimethylaminopropionamide, 2-dimethylaminoethyl acetate, 2-dimethylaminoethylcarbanilate, di-(2-dimethylaminoethyl)-adipate, 2:2'-dipyridyl, 1:10-phenanthroline.

A particularly preferred class of tertiary amines is that class comprising fully 4-N-substituted 4-aminopyridines such as 4-dimethylamino-4-piperidino- and 4-(1-pyrrolidinyl)pyridine, 1:4-diazabicyclo(2:2:2)-octane, 1:4-diazabicyclo(3:2:2)-nonane and 1:5-diazabicyclo(3:3:2)-decane.

More than one tertiary amine may be used simultaneously. It is frequently especially advantageous to use mixture of amines comprising at least one of the preferred classes of amine with another tertiary amine. Examples of such mixtures include 4-dimethylaminopyridine with dimethylbenzylamine and triethylene diamine with N-methyl morpholine.

The lead salt of the sulphur containing phosphoric, phosphinic or phosphonic acid, as hereinbefore defined, is usually incorporated in an amount of from 0.001% to 5% and preferably from 0.01% to 0.5% based on the weight of hydroxyl group-containing material.

The tertiary amine is usually incorporated in an amount of from 0.1% to 1.5% and preferably from 0.25% to 0.5% based on the weight of the hydroxyl group-containing material.

The lead salt and the tertiary amine are usually incorporated in proportions varying from 1:1 to 1:100 and preferably from 1:3 to 1:20.

It is a further feature of the present invention that there may be used as catalysts in the urethane forming reaction, a co-ordination complex of a lead salt of a sulphur containing phosphoric or phosphinic or phosphonic acid as hereinbefore defined, with a tertiary amine from a class of tertiary amines comprising tertiary heterocyclic amines in which one N atom is common to two rings and ditertiary amines in which the nitrogen atoms are separated one from another either by two or three carbon atoms.

As examples of such classes of tertiary amines which are normally of high steric availability there may be mentioned 4-N-substituted 4-aminopyridines such as 4-dimethylaminopyridine, 4-(pyrrolidinyl)pyridine, 4-piperidinopyridine, 4-morpholinopyridine, tertiary amines in which at least one nitrogen atom is common to two ring structures such as triethylene diamine, pyrrolizidine, quinuclidine, heterocyclic di-tertiary amines such as 2:2'-dipyridyl, 2:2'-diquinolinyl, and 1:10-phenanthroline and fully N-substituted di-tertiary amines in which the nitrogen atoms are separated by either two or three carbon atoms, such as N:N-dimethylpiperazine, N:N:N':N'-tetramethylethylene diamine, N:N:N':N'-tetramethylpropylene diamine, N:N'-dimethyl-1:4-diazacycloheptane and N:N'-dimethyl-1,5-diazacyclooctane.

It has been found that such tertiary amines when used in the process of the present invention may be present in the uncombined state or alternatively they may be present wholly or partly in the form of a co-ordination complex with a lead salt as hereinbefore defined.

Such co-ordination complexes may be used alone or in conjunction with an excess of the tertiary amine or in the presence of a second tertiary amine.

Mixtures of two or more co-ordination complexes may also be used as catalysts in the process of the present invention.

Such co-ordination complexes may be prepared in situ in the reaction mixture by adding the two components of the co-ordination complex to a reaction mixture containing the isocyanate and the hydroxyl containing material or alternatively the co-ordination complex may be prepared in a separate operation and the isolated product added to a reaction mixture containing the isocyanate and the hydroxyl containing material.

The co-ordination complexes which may be used in the process of the present invention may be prepared by, for example, methods of the type described in copending application No. 34,687/61 whereby a solution or finely divided suspension of an appropriate lead compound in a suitable medium is reacted at elevated temperature with a quantity of tertiary amine.

As examples of co-ordination complexes which may be used in the process of the present invention there may be mentioned complexes of either 4-dimethylaminopyridine or triethylenediamine or 2,2'-dipyridyl with lead dicyclohexyldithiophosphate or lead n-hexyldithiophosphate or lead dinonyldithiophosphate or lead diphenyldithiophosphate.

As examples of co-ordination complexes which are particularly useful in the process of the present invention there may be mentioned complexes of either 4-dimethylaminopyridine or triethylene diamine with lead di-n-hexyldithiophosphate, lead di-cyclohexyldithiophosphate, lead di-octyldithiophosphate, and lead di-nonyldithiophosphate.

The catalytic effect of a mixture or a co-ordination complex of a tertiary amine and a lead salt of a sulphur containing phosphoric, phosphinic or phosphonic acid, on the urethane forming reaction is far greater than the catalytic effect obtained when either of the component parts is used alone and is much greater than the sum of the catalytic effects of the component parts when used alone. The co-ordination complexes or the mixtures of catalysts used in the process of the present invention catalyse the reaction of an isocyanate both with water and with primary and secondary hydroxyl groups. They are also particularly valuable in that they accelerate the reaction of aliphatic isocyanates as well as the more reactive aromatic isocyanates.

The process of the present invention is particularly valuable for the manufacture of rigid or flexible, cellular or homogeneous polyurethane products by the interaction of hydroxyl group-containing polymers containing at least two isocyanate-reactive groups per molecule with organic polyisocyanates. Such polyurethane products may be prepared for example by methods and from materials fully described in the prior art, in the form of surface coatings, sheets, shaped articles or adhesive layers. Thus the hydroxyl group-containing polymer may be for example a polyester, polyesteramide or polyether, or mixtures thereof.

The polyesters or polyesteramides may be made for example from dicarboxylic acids and polyhydric alcohols, and, as necessary, minor proportions of diamines or aminoalcohols. Suitable dicarboxylic acids include succinic, glutaric, adipic, suberic, azelaic and sebacic acids as well as aromatic acids such as phthalic, isophthalic and terephthalic acids. Mixtures of acids may be used. Examples of polyhydric alcohols include glycols such as ethylene glycol, 1:2-propylene glycol, 1:3-butylene glycol, 2:3-butylene glycol, diethylene glycol, pentamethylene glycol, hexamethylene glycol, decamethylene glycol and 2:2-dimethyltrimethylene glycol. Other polyhydric alcohols containing more than two hydroxyl groups per molecule may be used, for example trimethylolpropane, trimethylolethane, pentaerythritol and glycerol. Such compounds are included in varying amounts according to the desired rigidity of the products.

In addition to the polyhydric alcohols and dicarboxylic acids there may also be reacted compounds containing more than two groups selected from hydroxyl, carboxyl and secondary and primary amino groups, of which examples include diethanolamine, trimesic acid, dihydroxystearic acid and tricarballylic acid.

Examples of diamines and aminoalcohols that may be used to make polyesteramides include ethylene diamine, hexamethylene diamine, monoethanolamine, phenylene diamine and benzidine.

The polyesters and polyesteramides used according to the process of the present invention normally have molecular weights of from 200 to 5000, with predominantly hydroxyl end groups.

As examples of polyethers for use in the process of the present invention there may be mentioned hydroxyl-ended polymers and copolymers of cyclic oxides, for example 1:2-alkylene oxides such as ethylene oxide, epichlorhydrin, 1:2-propylene oxide, 1:2-butylene oxide and 2:3-butylene oxide, oxacyclobutane and substituted oxacyclobutanes and tetrahydrofuran. Such polyethers may be linear polyether glycols as are prepared, for example, by the polymerisation of an alkylene oxide in the presence of a basic catalyst, such as potassium hydroxide, and a glycol or a primary monamine. Alternatively there may be used branched polyethers prepared for example by the polymerisation of an alkylene oxide in the presence of a basic catalyst and a substance having more than two active hydrogen atoms per molecule, for example ammonia and polyhydroxy compounds such as glycerol, hexanetriols, trimethylolethane, triethanolamine, pentaerythritol, sucrose and phenol-formaldehyde reaction products, aminoalcohols such as monoethanolamine and diethanolamine and polyamines such as ethylene diamine, hexamethylenediamine, diethylene triamine, tolylene diamine and diaminodiphenylmethane. Branched polyethers may also be produced by copolymerising a cyclic oxide of the type already mentioned with cyclic oxides having a functionality greater than two, for example diepoxides, glycidol and 3-hydroxymethyloxacyclobutanes.

The polyethers used according to the process of the present invention normally have molecular weights of from 200 to 8000. Mixtures of linear and branched polyethers may be used if desired.

Examples of suitable organic polyisocyanates include aliphatic diisocyanates such as hexamethylene diisocyanate, aromatic diisocyanates such as tolylene-2:4-diisocyanate, tolylene-2:6-diisocyanate, diphenylmethane-4:4'-diisocyanate, 3-methyldiphenylmethane-4:4' - diisocyanate, m- and p-phenylene diisocyanate, chlorophenylene-2:4-diisocyanate, naphthalene-1:5-diisocyanate, 4:4'-diisocyanatediphenyl, 4:4'-diisocyanate-3:3'-dimethyldiphenyl and diphenyl ether diisocyanates and cycloaliphatic diisocyanates such as dicyclohexylmethane diisocyanates. Triisocyanates which may be used include aromatic triisocyanates such as 2:4:6-triisocyanatotoluene and 2:4:4'-triisocyanatodiphenyl ether. Examples of other suitable organic polyisocyanates comprise the reaction products of an excess of a diisocyanate with polyhydric alcohols such as trimethylolpropane, and uretedione dimers and isocyanurate polymers of diisocyanates for example of tolylene-2:4-diisocyanate. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine.

It has been found that the process of the present invention is especially advantageous when applied to the manufacture of foamed, cellular polyurethane products by the reaction of hydroxyl group-containing polymers such as polyesters, polyesteramides and polyethers containing at least two isocyanate-reactive groups per molecule with organic polyisocyanates in the presence of water and/or a low boiling point liquid.

Suitable low-boiling point liquids are liquids that are chemically inert towards isocyanates and water and have boiling points not exceeding 75° C., preferably between —40° C. and 50° C., for example fluorinated alkanes such as monofluoro-trichloromethane, dibromo-difluoromethane, 1:1:2-trichloro-1:2:2-trifluoroethane, dichlorofluoromethane, dichloromonofluoromethane, dichlorotetrafluoroethane, monochlorodifluoromethane and trifluoroethyl bromide or mixtures thereof.

Mixtures of these low boiling liquids one with another and/or with non-fluorine-containing substituted or unsubstituted hydrocarbons, may also be used.

Such liquids are usually employed in amounts of from 1% to 100%, preferably from 5% to 25% by weight of the hydroxylic polymer.

Water is usually employed in amounts of from 1 to 10% by weight of the hydroxyl group-containing polymer, when this is used as the source of carbon dioxide blowing gas.

The use of the mixtures of co-ordination compounds of tertiary amines with lead salts of the sulphur containing phosphoric, phosphinic or phosphonic acids as hereinbefore defined as catalysts in the preparation of foamed polyurethanes leads to the formation of products of low density and good physical properties. The foamed products reach their fully cured state rapidly, often rendering unnecessary an after-cure at an elevated temperature, for example in an oven. They are of very high stability to heat and will withstand heating in the atmosphere for many hours without undue deterioration.

The preparation of the foamed, cellular polyurethanes may be carried out by the general methods fully described in the prior art. Thus the materials may be mixed continuously or discontinuously and the hydroxyl group-containing polymer may be first reacted with part or the whole of the organic polyisocyanate before the final reaction to give a foam is carried out in a second stage. However it is generally preferred to carry out the foam preparation in one stage only, by the simultaneous reaction of the foam-forming ingredients, namely the hydroxyl group-containing polymer, the organic polyisocyanate and the water and/or the low boiling point liquid. This convenient one-stage process cannot be satisfactorily carried out with all hydroxyl group-containing polymers. In particular those polymers containing predominantly secondary hydroxyl end-groups do not normally give satisfactory foams using a one-stage process as defined above: using such polymers the foam-forming mass usually partially or wholly collapses with considerable loss of gas and the formation of unsatisfactory high density products. The one stage process gives particularly unsatisfactory results using polyethers having predominantly secondary hydroxyl end groups.

It has now been found that highly attractive low density foamed products may be obtained by a one stage process by incorporating a mixture of a tertiary amine with a lead salt of the type already referred to above, or a co-ordination complex of a tertiary amine with a lead salt of the type referred to above with an additional quantity of a tertiary amine which may be the same or different.

Thus according to a preferred embodiment of the present invention there is provided a process for the manufacture of foamed, cellular polyurethane products by the simultaneous interaction of a secondary hydroxyl-ended polymer, especially a polyether, an organic polyisocyanate and water and/or a low boiling point liquid, characterised in that there is present a mixture of or a co-ordination compound of a tertiary amine and a lead salt of a sulphur containing phosphoric, phosphinic or phosphonic acid as hereinbefore defined.

Examples of predominantly secondary hydroxyl-ended polymers include polyesters and polyester amides prepared from an excess of polyhydric alcohol and amino compound over dicarboxylic acid, wherein the polyhydric alcohol contains secondary hydroxyl groups, for example propylene glycol, 1:3-butylene glycol or glycerol. Secondary hydroxyl-ended polyethers include polymers and copolymers of 1:2-alkylene oxides such as propylene and butylene oxides. It is preferred to use predominantly secondary hydroxyl-ended polymers of propylene oxide, especially those with molecular weights of from 400 to 8000.

When tertiary amines are used as catalysts in the simultaneous interaction of polyisocyanates and secondary hydroxyl-ended polymers to give foams, as described above, the reaction is slow and the products have the disadvantage of requiring a heat cure and have a tendency to contain splits and voids. The use of tertiary amines in conjunction with the lead salts of the present invention obviates the need for a heat cure and gives foam without splits or voids but which in certain cases have an undesirable number of closed cells.

We have found that if the lead salt/tertiary amine catalysts of the present invention are used in conjunction with zinc salts of the sulphur containing phosphoric or phosphinic acids described in co-pending application No. 175,813, filed Feb. 26, 1962, for example zinc dinonyl dithiophosphate, foams are obtained which are free of splits and which contain very few, if any, closed cells.

Thus according to a further embodiment of the present invention there is provided a process for the manufacture of foamed cellular polyurethane products by the simultaneous interaction of a secondary hydroxyl-ended polymer, especially a polyether, an organic polyisocyanate and water and/or a low boiling point liquid, characterised in that there is present a tertiary amine, a lead salt of a sulphur containing phosphoric, phosphinic or phosphonic acid as hereinbefore defined and a zinc salt of a sulphur containing phosphoric or phosphinic acid of the type defined in copending application No. 175,813.

As described fully in the prior art the general method of preparation of the polyurethanes may include the incorporation in the polyurethane-forming mixture of various additives such as surface-active agents, for example oxy-ethylated phenols, fatty alcohols such as oleyl alcohol or sulphated methyl oleate, polyalkylsiloxanes, and block copolymers thereof with polyalkylene oxides, flame-retardants, such as beta-trichloroethyl phosphate, and antimony oxide, plasticisers such as tricresyl phosphate and dioctyl phthalate, colouring matters and fillers such as carbon black and silica and colour stabilisers and whitening agents. Other types of catalysts, for example, soluble organic compounds of metals, for example of the transition metals, such as iron and manganese acetyl acetonate, and of tin and antimony, for example dibutyl tin dilaurate and stannous octoate, compounds of lead such as lead acetate, basic lead acetate and lead 2-ethylhexoate, may also be incorporated. A further class of additive that may be added comprises antioxidants, for example tert. butyl-catechol and sterically hindered phenols.

The catalysts used in the process of the present invention as hereinbefore described obviate or minimise the disadvantages associated with the use of the prior art catalysts. Thus the lead compounds used in the process of the present invention are easily prepared stable compounds which maintain their activity in the presence of water, polyisocyanates and/or hydroxylic compounds as are used in the manufacture of polyurethane materials. They also possess advantages over the organo-tin compounds as described in the prior art in that they do not promote oxidative breakdown or degradation of polyurethanes based for example on polyethers.

The invention is illustrated but not limited by the following examples in which all parts and percentages are by weight unless otherwise stated.

Example 1

182 parts of a polyester resin prepared by reacting 4704 parts of adipic acid with 1015 parts of glycerol and 1792 parts of ethylene glycol are dissolved in a mixture of 350 parts methylethylketone and 84 parts of cyclohexanone. A solution of 72.8 parts of an 80:20 mixture of tolylene-2:4-diisocyanate and tolylene-2:6-diisocyanate in 56 parts methylethylketone and 14 parts cyclohexanone is added followed by the quantity of catalyst in the following table. The resultant lacquer is applied to thin steel sheets and the time for the coating to reach a tack-free condition is observed. The gelation time of the lacquer itself at room temperature is also observed.

The results are tabulated below:

| Catalyst | Time required for surface coating to dry | Gelation time of lacquer |
|---|---|---|
| (a) Control—no catalyst | 200 hr | 200 hr. |
| (b) Lead di-n-hexyldithiophosphate, 0.7 part | 21.5 hr | 20.5 hr. |
| (c) Lead di-cyclohexyldithiophosphate, 0.7 part | 25.5 hr | 24.5 hr. |
| (d) Lead dononyl dithiophosphate, 0.7 part | 5.0 hr | 4.25 hr. |
| (e) Lead diphenyldithiophosphate, 0.7 part | 45 hr | 42 hr. |
| (f) Addition complex of 1 mol. lead dinonyldithiophosphate with 2 mol. 4-dimethylaminopyridine, m.pt. 64-66.5° C., 0.7 part (this is equivalent to lead dinonyldithiophosphate, 0.56 part and 4-dimethylaminopyridine, 0.14 part) | 100 min | 70 min. |
| (g) Lead dinonyldithiophosphate, 0.56 part; 4-dimethylaminopyridine, 0.14 part | 100 min | 70 min. |
| (h) Lead dinonyldithiophosphate, 0.18 part; 4-dimethylaminopyridine 0.35 part | 45 min | 25 min. |
| (i) Addition complex of 1 mol lead di-cyclohexyldithiophosphate and 2 mol 4-dimethylaminopyridine m.pt.125-127° C., 0.7 part (this is equivalent to lead di-cyclohexyldithiophosphate, 0.53 part and 4-dimethylaminopyridine, 0.16 part) | 80 min | 50 min. |
| (j) Lead dicyclohexyldithiophosphate, 0.53 part; 4-dimethylaminopyridine, 0.16 part. | 85 min | 51 min. |
| (k) Addition complex of 1 mol lead di-cyclohexyldithiophosphate and 2 mol. triethylene diamine m.pt. 156-8° C. (this is equivalent to lead dicyclohexyldithiophosphate, 0.53 part and triethylene diamine, 0.16 part. | 120 min | 83 min. |
| (l) Lead dicyclohexyldithiophosphate, 0.53 part; triethylene diamine 0.16 part. | 110 min | 85 min. |
| (m) Lead dicyclohexyldithiophosphate, 0.18 part; triethylene diamine 0.35 part. | 45 min | 24 min. |
| (n) Lead di-n-hexyl-dithiophosphate, 0.18 part; 4-dimethylaminopyridine, 0.35 part. | 45 min | 26 min. |
| CONTROL AMOUNTS OF TERTIARY AMINE USED ALONE | | |
| (o) 4-dimethylaminopyridine, 0.35 part | 65 min | 35 min. |
| (p) 4-dimethylaminopyridine, 0.14 part | 140 min | 110 min. |
| (q) Triethylene diamine, 0.35 part | 60 min | 35 min. |
| (r) Triethylene diamine, 0.16 part | 140 min | 105 min. |

The relatively low catalytic activity of the lead salts of the dithiophosphoric acid will be observed. The co-ordination complexes with tertiary amines are seen to be much more active. The improvement in drying time by adding a quantity of one of the lead compounds to the tertiary amine (p versus f and r versus l) (o versus n or h and q versus m), is of considerable value as it enables surface coatings to be obtained with minimum usage of 150° C. show surprisingly little deterioration of physical properties.

In the absence of lead dinonyldithiophosphate the mixture expands more slowly losing gas and finally collapsing as a result of insufficient gelatin.

| Example No. | Diol (parts) | Triol (parts) | Catalyst mixture (parts) | Alkyl silane polyoxyalkylene copolymer (parts) | Water (parts) | Tolylene diisocyanate (parts) |
|---|---|---|---|---|---|---|
| 3 | | 400 | 1.0 lead dinonyldithiophosphate; 1.32 4-dimethylaminepyridine. | 3.2 | 13.6 | 170.8 |
| 4 | | 400 | 2.5 lead dinonyldithiophosphate; 1.32 4-dimethylaminopyridine. | 3.2 | 13.6 | 170.8 |
| 5 | | 200 | 200 | do | 3.2 | 13.6 | 170.8 |
| 6 | | | 400 | do | 3.2 | 11.6 | 152 |
| 7 | | 200 | 200 | 2.5 lead di-n-hexyl dithiophosphate; 1.32 4-dimethylaminopyridine. | 3.2 | 11.6 | 152 |
| 8 | | | 400 | do | 3.2 | 13.6 | 170.8 |
| 9 | | | 400 | 2.5 lead dicyclohexyldithipohosphate; 1.32 4-dimethylaminopyridine. | 3.2 | 13.6 | 170.8 |
| 10 | | | 400 | 1.5 addition complex of 1 mol lead dinonyldithiophosphate and 2 mol 4-dimethylaminopyridine, m. pt. 64–66.5° C; 1.0 4-dimethylaminopyridine. | 3.2 | 13.6 | 170.8 |
| 11 | | 200 | 200 | do | 3.2 | 13.6 | 170.8 |
| 12 | | | 400 | 1.5 addition complex of 1 mol lead dicyclohexyldithiophosphate and 2 mol. 4-dimethylaminopyridine, m.pt. 125–127° C., 1.0 4-dimethylaminopyridine. | 3.2 | 13.6 | 170.8 |
| 13 | | | 400 | 1.5 addition comples of 1 mol lead dicyclohexyldithiophosphate and 2 mol triethylene diamine, m. pt. 156–8° C.; 1.0 4-dimethylaminopyridine. | 3.2 | 13.6 | 170.8 |
| 14 | | | 400 | 1.5 addition complex of 1 mol lead dicyclohexyldithiophosphate and 2 mol triethylene diamine, m. pt. 156–8° C.; 1.0 triethylene diamine. | 3.2 | 13.6 | 170.8 |
| 15 | | | 400 | 1.5 addition complex of 1 mol lead dinonyldithiophosphate and 2 mol 4-dimethylaminopyridine, m.pt. 64–66.5° C.; 0.25 zinc dinonyldithiophosphate; 1.0 4-dimethylaminopyridine. | 3.2 | 13.6 | 170.8 |
| 16 | | | 400 | 1.0 lead dinonyldithiophosphate; 1.32 4-dimethylaminopyridine; 0.25 zinc dinonyldithiophosphate. | 3.2 | 13.6 | 170.8 |
| 17 | | 200 | 200 | 1.0 lead dinonyldithiophosphate; 1.3 triethylene diamine; 0.25 zinc dinonyldithiophosphate. | 3.2 | 11.6 | 152 |
| 18 | | | 400 | 1.0 lead dinonyldithiophosphate; 1.2 4-dimethylaminopyridine; 0.3 N:N-dimethylbenzylamine. | 3.2 | 13.6 | 170.8 | basic catalyst, residual amounts of which may have a degrading effect on the film.

*Example 2*

200 parts of a linear polyoxypropylene diol of approximate molecular weight 2,000 obtained by the reaction of propylene oxide with water, 200 parts of a branched polyoxypropylene triol of approximate molecular weight 3,000 obtained by the reaction of propylene oxide with glycerol, 1.0 part of lead dinonyldithiophosphate, 3.2 parts of an alkylsilane-polyoxypropylene copolymer, 13.6 parts of water in which has been dissolved 1.32 parts of 4-dimethylaminopyridine are mixed together.

170.8 parts of an 80:20 mixture of tolylene-2:4-diisocyanate and tolylene-2:6-diisocyanate are added to the mixture with vigorous agitation, and the foaming and still fluid reaction mixture is poured into a mould. The mixture expands with negligible loss of gas and cures rapidly to give a flexible foam of low density and of good physical properties. A feature is the rapid hardening of the surface which permits easy handling. Good heat stability is another valuable property. Samples of foams after heating for 4 hours at 125° C. followed by one hour at

*Examples 2–14*

All the above examples give foams of good physical properties, low density and high stability to heat. In the absence of the lead catalyst in each instance the rate of expansion of the foam is decreased, gas is lost and the foam ultimately collapses as a result of inadequate gelation. In no instance is subsequent heat curing of the foam necessary to develop adequate physical characteristics.

*Examples 15–17*

The inclusion of zinc dinonyldithiophosphate yields a foam of rather lower density. These foams also need no subsequent heat cure to develop good tear and tensile strength. They are characterised by containing a remarkably low proportion of closed cells, while splits are almost completely absent.

What I claim is:

1. Process for the manufacture of polyurethane materials by the interaction of organic polyisocyanates with hydroxyl group-containing polymers containing at least two isocyanate reactive groups per molecule in the presence of a catalyst combination comprising a tertiary amine and a lead salt of a thio acid of phosphorus selected from the group consisting of thio acids of phosphorus of the formulae:

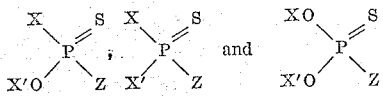

wherein X and X' are selected from the group consisting of monovalent hydrocarbon radicals, monovalent hydrocarbon radical interrupted by at least one oxygen atom, and groups wherein X and X' are connected together and together constitute a member selected from the class consisting of alkylene and alkylene interrupted by at least one oxygen atom, and Z is a member of the group consisting of hydroxyl and thiol groups.

2. A process for the manufacture of polyurethane materials as set forth in claim 1 in which said lead salt is lead dicyclohexyl dithiophosphate.

3. A process for the manufacture of polyurethane materials as set forth in claim 1 in which said lead salt is lead dinonyldithiophosphate.

4. A process for the manufacture of polyurethane materials as set forth in claim 1 in which said tertiary amine is selected from the group consisting of 4-dimethylaminopyridine, 4-piperidinopyridine, 4-pyrolidinylpyridine, 1:4-diazabicyclo(2:2:2)-octane, 1:4-diazabicyclo(3:2:2)-nonane and 1:5-diazabicyclo(3:2:2)-decane.

5. A process for the manufacture of polyurethane materials as claimed in claim 1 wherein the lead salt is incorporated in the reaction mixture in an amount of from 0.001% to 5.0% based on the weight of the hydroxyl group-containing compound.

6. A process for the manufacture of polyurethane materials as set forth in claim 5 in which the amount of lead salt is from 0.01% to 5.0% based on the weight of the hydroxyl group-containing compound.

7. A process for the manufacture of polyurethane materials as claimed in claim 1 wherein the tertiary amine is incorporated in the reaction mixture in an amount of from 0.1% to 1.5% based on the weight of hydroxyl group-containing compound.

8. A process for the manufacture of polyurethane materials as set forth in claim 7 wherein the tertiary amine is incorporated in the reaction mixture in an amount of from 0.25 to 0.5% based on the weight of the hydroxyl group-containing compound.

9. A process for the manufacture of polyurethane materials as claimed in claim 1 wherein the lead salt and tertiary amine are incorporated in proportions of from 1:1 to 1:100 one to the other.

10. A process for the manufacture of polyurethane materials as claimed in claim 9 wherein the lead salt and tertiary amine are incorporated in proportions of from 1:3 to 1:20, one to the other.

11. A process for the manufacture of polyurethane materials as claimed in claim 1 wherein the tertiary amine is selected from the group consisting of tertiary heterocyclic amines in which one N atom is common to two rings; and ditertiary amines in which the nitrogen atoms are separated one from another by two to three carbon atoms, the said tertiary amine being present at least in part as a coordination complex with the lead salt.

12. Process for the manufacture of polyurethane materials as claimed in claim 1 wherein the reaction is carried out in the presence of a member of the group consisting of water and a low boiling point liquid which is chemically inert toward isocyanates and water and which has a boiling point not exceeding 75° C.

13. Process for the manufacture of polyurethane materials as claimed in claim 12 wherein the hydroxyl group-containing polymer is a predominantly secondary hydroxyl-ended polymer and the interaction between the said polymer, polyisocyanate and water is carried out simultaneously.

14. Process for the manufacture of urethane group-containing materials as claimed in claim 13 wherein the polymer is a predominantly secondary hydroxyl ended polymer of propylene oxide of molecular weight between 400 and 8000.

15. A process for the manufacture of polyurethane materials as set forth in claim 11 in which said coordination complex is a complex of 4-dimethylaminopyridine and lead dinonyldithiophosphate.

16. A process for the manufacture of polyurethane materials as set forth in claim 11 in which said coordination complex is a complex of triethylene diamine and lead di-n-hexyldithiophosphate.

17. A process for the manufacture of polyurethane materials as set forth in claim 11 in which said coordination complex is a complex of triethylene diamine and lead dicyclohexyldithiophosphate.

18. A process for the manufacture of polyurethane materials as set forth in claim 11 in which said coordination complex is a complex of triethylene diamine and lead dioctyldithiophosphate.

19. A process for the manufacture of polyurethane materials as set forth in claim 11 in which said coordination complex is a complex of triethylene diamine and lead dinonyldithiophosphate.

References Cited by the Examiner

UNITED STATES PATENTS

| | | | |
|---|---|---|---|
| 2,906,731 | 9/59 | Hill | 260—45.75 |
| 2,939,851 | 6/60 | Orchin | 260—77.5 |
| 2,976,260 | 3/61 | Newland | 260—45.95 |
| 2,984,645 | 5/61 | Hoeschele | 260—45.8 |
| 3,041,311 | 6/62 | Baum | 260—45.75 |
| 3,050,477 | 8/62 | Gmitter et al. | 260—45.7 |
| 3,054,756 | 9/62 | Holtschmiedt | 260—75 |
| 3,109,825 | 11/63 | O'Mant et al. | 260—2.5 |

LEON J. BERCOVITZ, Primary Examiner.

DONALD E. CZAJA, Examiner.